(12) United States Patent
Vaughn et al.

(10) Patent No.: US 9,512,774 B2
(45) Date of Patent: Dec. 6, 2016

(54) COOLING DEVICE FOR USE WITH ENGINES

(75) Inventors: Christopher W. Vaughn, Mebane, NC (US); Jeffrey A. Wians, Mebane, NC (US)

(73) Assignee: Honda Motor Co., Ltd., Tokyo (JP)

( * ) Notice: Subject to any disclaimer, the term of this patent is extended or adjusted under 35 U.S.C. 154(b) by 914 days.

(21) Appl. No.: 13/593,200

(22) Filed: Aug. 23, 2012

(65) Prior Publication Data

US 2014/0056703 A1 Feb. 27, 2014

(51) Int. Cl.
| F04D 17/16 | (2006.01) |
| F01P 5/02 | (2006.01) |
| F04D 29/60 | (2006.01) |
| F04D 29/66 | (2006.01) |
| F04D 29/24 | (2006.01) |
| F04D 29/30 | (2006.01) |
| F01P 11/12 | (2006.01) |
| F04D 29/32 | (2006.01) |
| F04D 29/26 | (2006.01) |

(Continued)

(52) U.S. Cl.
CPC .................. *F01P 5/02* (2013.01); *F01P 11/12* (2013.01); *F04D 17/16* (2013.01); *F04D 29/242* (2013.01); *F04D 29/263* (2013.01); *F04D 29/282* (2013.01); *F04D 29/30* (2013.01); *F04D 29/326* (2013.01); *F04D 29/328* (2013.01); *F04D 29/60* (2013.01); *F04D 29/666* (2013.01); *F04D 19/022* (2013.01)

(58) Field of Classification Search
CPC .... F04D 29/281; F04D 29/282; F04D 29/325; F04D 29/327; F04D 29/328; F04D 29/52; F04D 29/522; F04D 29/582; F04D 17/16; F04D 25/08; F04D 25/082; F04D 29/60; F04D 29/62; F04D 29/666; F04D 29/263; F04D 29/242; F04D 29/30
USPC ..... 415/206; 416/179–183, 185, 189, 193 R, 416/198 R, 200 R, 200 A, 201 R, 201 A, 198 A, 416/203, 60, 146 R
See application file for complete search history.

(56) References Cited

U.S. PATENT DOCUMENTS

| 585,188 A | 6/1897 | Davis |
| 3,155,083 A | 11/1964 | Middlesworth et al. |

(Continued)

FOREIGN PATENT DOCUMENTS

| CN | 101713324 A | 5/2010 |
| CN | 201512745 U | 6/2010 |

OTHER PUBLICATIONS

PCT International Search Report and Written Opinion for related matter PCT/US2013/055784 dated Jan. 29, 2014.

(Continued)

*Primary Examiner* — Richard Edgar
*Assistant Examiner* — Jesse Prager
(74) *Attorney, Agent, or Firm* — Armstrong Teasdale LLP

(57) ABSTRACT

A cooling device for use with an engine is provided. The cooling device includes a flow control portion that includes a base and an opening defined therein. The flow control portion also includes a plurality of blades that extend from at least a portion of the base. The cooling device also includes a grid portion having an opening defined therein, said grid portion opening is substantially concentrically aligned with the base opening. An attachment portion is configured to couple the cooling device to at least one rotatable component of the engine. Each of the flow control (Continued)

portion, the grid portion, and the attachment portion are formed integrally together such that the cooling device is a single component.

19 Claims, 5 Drawing Sheets

(51) Int. Cl.
 *F04D 29/28* (2006.01)
 *F04D 19/02* (2006.01)

(56) References Cited

U.S. PATENT DOCUMENTS

| | | | |
|---|---|---|---|
| 3,952,712 | A | 4/1976 | Hermanson |
| 4,838,908 | A | 6/1989 | Bader et al. |
| 5,494,006 | A | 2/1996 | Davis, Jr. |
| 5,735,669 | A | 4/1998 | Niemela |
| 6,006,703 | A * | 12/1999 | Nakamura ............ F04D 29/281 123/41.65 |
| 6,145,479 | A | 11/2000 | Rotter |
| 7,125,226 | B2 * | 10/2006 | Horng et al. ................. 416/203 |
| 7,225,765 | B2 | 6/2007 | Leech et al. |
| 7,363,885 | B2 | 4/2008 | Miyake et al. |
| 7,563,204 | B2 | 7/2009 | Wasson et al. |
| 7,934,481 | B2 | 5/2011 | Zingelmann |
| 2003/0044271 | A1 | 3/2003 | Bae |
| 2003/0044283 | A1 | 3/2003 | Nadeau et al. |
| 2005/0163614 | A1 | 7/2005 | Chapman |
| 2006/0266308 | A1 | 11/2006 | Leech et al. |
| 2006/0288970 | A1 | 12/2006 | Miyake et al. |
| 2009/0229558 | A1 * | 9/2009 | Zingelmann ............. F02N 3/02 123/185.3 |

OTHER PUBLICATIONS

EPO Extended Search Report for related application 13830671.7 dated Jan. 13, 2016; 9 pp.

China First Office Action for related application 201380043970.3 dated Jul. 22, 2016; 23 pp.

Australia Examination Report for related application 2013305972 dated Aug. 26, 2016; 3 pp.

* cited by examiner

COOLING DEVICE FOR USE WITH ENGINES

BACKGROUND

The field of the invention relates generally to engines and, more particularly, to a cooling device for use with engines.

At least some known engines include various rotating components that may be used to start and/or cool the engine. For example, engines for lawn mowers may include a flywheel, a flow control apparatus, such as a fan, a screen or grid, and an attachment device, such as a retainer or starter cup. The starter cup may be used to couple the components to a rotatable shaft. During operation, the shaft is rotated to enable the other rotating components to rotate via mechanical rotational energy. As such, the fan is able to generate a fluid flow that may be channeled to various portions of the engine to facilitate cooling the engine.

In at least some known power equipment engines, the rotating components are separate and distinct components. For example, in at least some known engines, the flywheel is a separate and distinct component from the fan. While the starter cup and the fan may be integrally formed together as a single component, the rotating screen is generally a separate and distinct component from the starter cup/fan component. Having such separate and distinct components, however, can be complex and inefficient. For example, several components may need to be purchased and assembled as opposed to simply purchasing a single component. Moreover, having separate and distinct components requires assembly and such assembly may be a time-consuming task.

BRIEF DESCRIPTION

In one embodiment, a cooling device for use with an engine is provided. The cooling device includes a flow control portion that includes a base and an opening defined therein. The flow control portion also includes a plurality of blades that extend from at least a portion of the base. The cooling device also includes a grid portion having an opening defined therein. The grid portion opening is substantially concentrically aligned with the base opening. An attachment portion extends at least partially through the base opening and the grid portion opening. The attachment portion is formed integrally with the flow control portion and the grid portion. The attachment portion is configured to couple the cooling device to at least one rotatable component of the engine.

In another embodiment, an engine is provided. The engine includes a rotatable shaft and an adaptor plate coupled to the rotatable shaft. The adaptor plate includes a surface that includes a first portion and a second portion, wherein the first portion extends arcuately towards the second portion to facilitate defining a flow path within the engine. A cooling device is coupled to the rotatable shaft and to the adaptor plate such that the cooling device is positioned against at least a portion of the adaptor plate surface to enable fluid to be channeled from the adaptor plate surface to the cooling device, via the flow path. The cooling device includes a flow control portion, a grid portion, and an attachment portion. The flow control portion includes an opening defined therein and a plurality of blades extending outward from the opening. The opening is sized to receive at least a portion of the adaptor plate therein. The grid portion includes an opening defined therein and the grid portion opening is substantially concentrically aligned with the flow control portion opening. The attachment portion is configured to couple the cooling device to the rotatable shaft.

In yet another embodiment, a cooling device for use with an engine is provided. The cooling device includes a flow control portion having a base and an opening defined therein. The flow control portion further includes a plurality of blades extending integrally from the base and a grid portion having an opening defined therein. The grid portion is formed integrally with said flow control portion. The grid portion includes a plurality of first fan blades that extend radially outwardly from the grid portion opening and a plurality of second fan blades that are substantially perpendicular to the plurality of first fan blades. The cooling device is configured to rotate to provide cooling flow to facilitate cooling the engine. An attachment portion that is formed integrally with the grid portion and the flow control portion is configured to couple the cooling device to at least one rotatable component in the engine.

DETAILED DESCRIPTION

The exemplary apparatus and systems described herein overcome at least some known disadvantages of at least some known cooling devices that may be used with engines. More specifically, the embodiments described herein provide a cooling device that has a flow control portion, a grid portion, and an attachment portion that are formed integrally together such that the cooling device is a single component. Because the cooling device is a single component, a plurality of separate components are no longer necessary and assembly is reduced when using the cooling device with the engine. Accordingly, as compared to known cooling devices, the cooling device described herein is more simple and efficient for use with engines.

Figure 1:
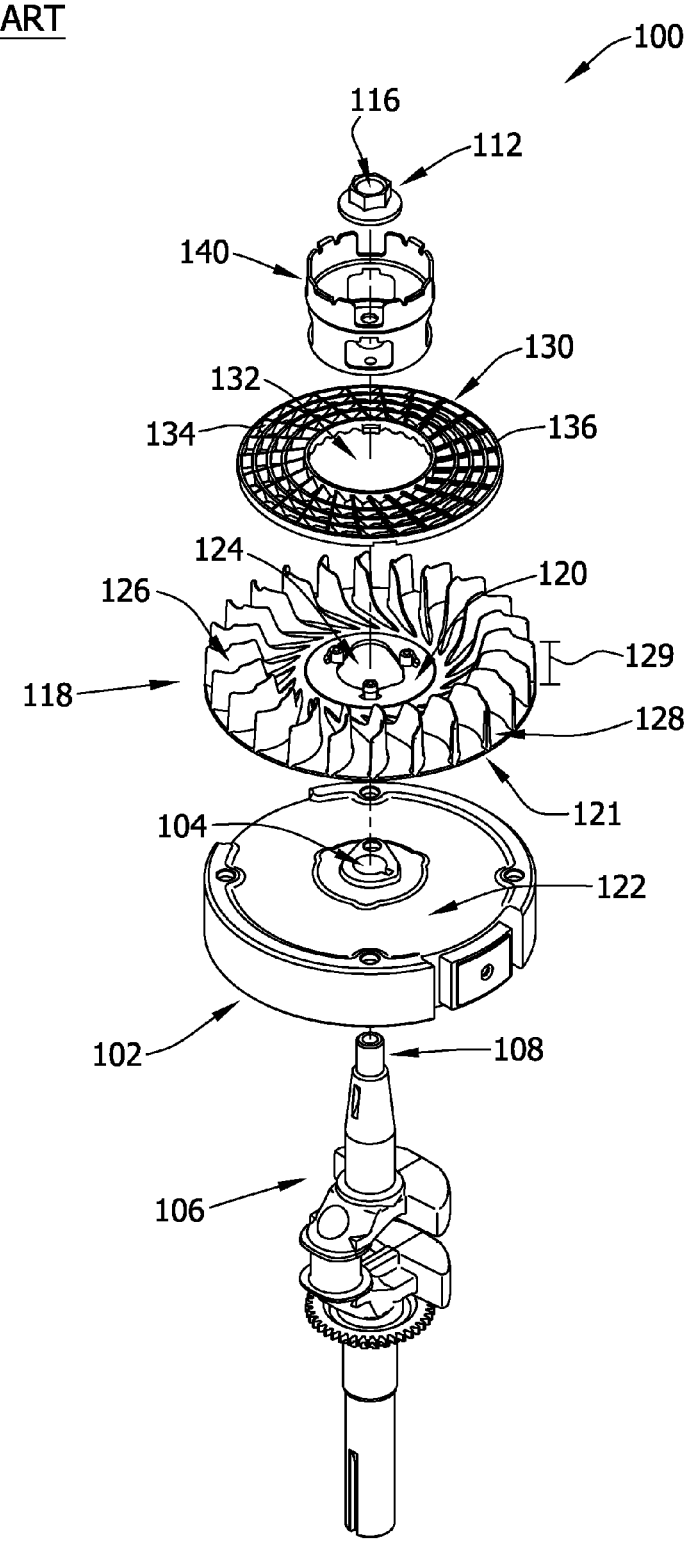
FIG. 1 is a schematic of an exploded view of a portion of an exemplary known engine.

FIG. 1 illustrates a portion of an exemplary known internal combustion engine 100 that may be used in power equipment, such as a rotary mower or a water pump, for example. More specifically, in the exemplary embodiment, the engine 100 is a four-stroke cycle engine that operates using liquid fuels, such as gasoline. The engine 100 includes an adaptor plate 102. More specifically, in the exemplary embodiment, the adaptor plate 102 is a flywheel that is substantially circular and that rotates about a bearing (not shown). The adaptor plate 102 includes at least one opening 104 defined therein that is sized to receive a shaft 106 therethrough. More specifically, at least one end portion 108 of the shaft 106 extends through opening 104. A fastener 112 is coupled to shaft end portion 108 such that the fastener 112 substantially circumscribes at least a portion of shaft end portion 108. More specifically, in the exemplary embodiment, the fastener 112 is a nut having an opening 116 defined therein.

The engine 100 also includes a flow control apparatus 118 that is coupled to the adaptor plate 102 such that at least a portion of flow control apparatus 118 is positioned against adaptor plate 102. More specifically, in the exemplary embodiment, the flow control apparatus 118 is a fan that includes a base 120. The fan is positioned such that a lower surface 121 of the base 120 is positioned against an upper surface 122 of the adaptor plate 102. The base 120 also includes an opening 124 defined therein. A plurality of blades 126 are coupled to an upper surface 128 of the base 120. More specifically, each blade 126 is substantially perpendicular to the surface 128 and extends a vertical distance 129 from the surface 128. A screen or grid 130 extends from the flow control apparatus 118 such that the grid 130 is coupled to at least a portion of each blade 126. The grid 130 includes an opening 132 formed therein and a plurality of first fan blades 134 that extend radially outwardly from the grid opening 132, and a plurality of annular second fan blades 136 that are oriented substantially perpendicularly to the first fan blades 134. The engine 100 also includes a starter cup or attachment device 140 that is coupled to the flow control apparatus 118 and the grid 130. The attachment device 140 is configured to couple the flow control apparatus 118 and the grid 130 to the shaft 106.

In the engine 100, the adaptor plate 102, the flow control apparatus 118, the grid 130, and the attachment device 140 are each separate and distinct components that are coupled together. Having such separate and distinct components for the engine 100 can make the fabrication, assembly, and maintenance of the engine 100 complex and inefficient. For example, in the exemplary embodiment, each of the adaptor plate 102, the flow control apparatus 118, the grid 130, and/or the attachment device 140 may need to be purchased separately and assembly of the engine 100 may be a time-consuming task.

Figure 2:
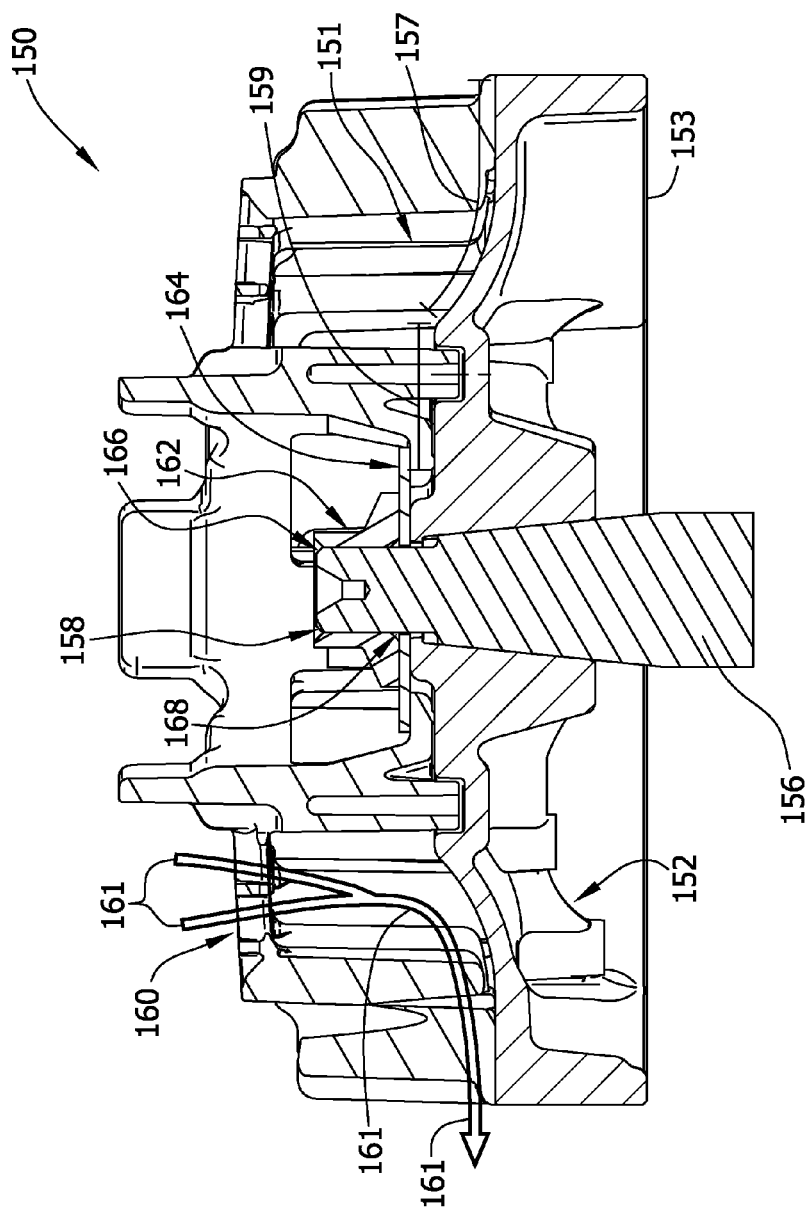
FIG. 2 is a schematic of a cross-sectional view of a portion of an exemplary engine.
Figure 3:
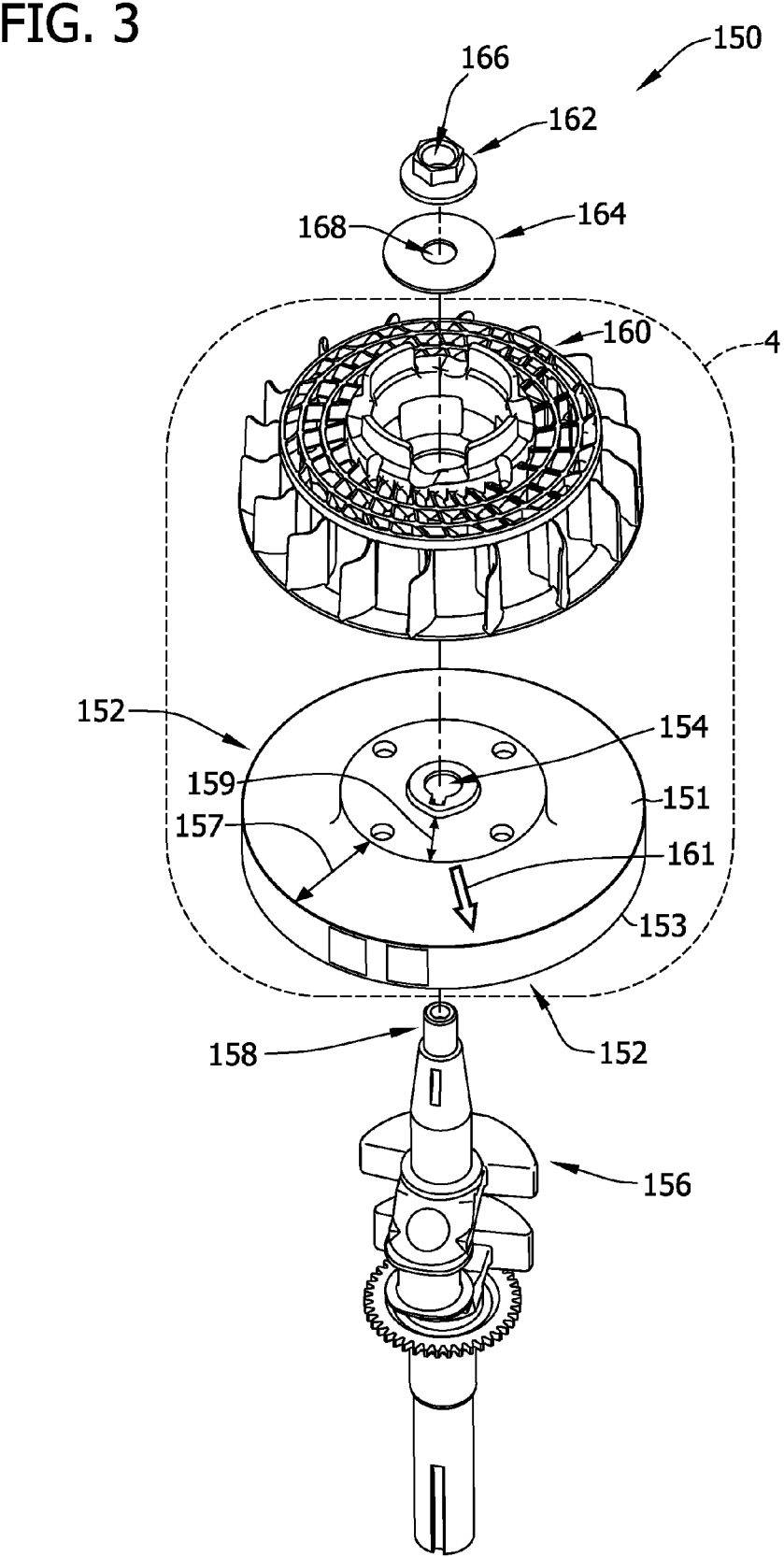
FIG. 3 is a schematic of an exploded view of a portion of the engine shown in FIG. 2.

FIG. 2 illustrates a cross-sectional view of an exemplary engine 150. FIG. 3 illustrates an exploded view of a portion of the engine 150. In the exemplary embodiment, the engine 150 is an internal combustion engine that may be used in power equipment, such as a rotary mower or a water pump, for example. More specifically, in the exemplary embodiment, the engine 150 is a four-stroke cycle engine that operates using liquid fuels, such as gasoline. The engine 150 includes an adaptor plate 152 that has an upper surface 151 and an opposite lower surface 153. More specifically, in the exemplary embodiment, the upper surface 151 includes a first portion 157 and a second portion 159, wherein the first portion 157 extends substantially curvilinearly towards the second portion 159 to facilitate defining a flow path, as shown by arrows 161, for fluids, such as air. Moreover, in the exemplary embodiment, adaptor plate 152 is a flywheel that is substantially circular and that rotates about a bearing (not shown). The adaptor plate 152 includes at least one opening 154 defined therein that is sized to receive a shaft 156 therethrough. More specifically, the shaft 156 extends at least partially through the opening 154 and includes at least one end portion 158 that is coupled to a cooling device 160.

A fastener 162 and a plate 164 are each coupled to shaft end portion 158. More specifically, in the exemplary embodiment, the fastener 162 is an annular nut that includes an opening 166 defined therein such that the fastener 162 substantially circumscribes at least a portion of the shaft end portion 158 when coupled to the shaft 156. In the exemplary embodiment, the plate 164 is an annular washer that includes an opening 168 defined therein that is sized such that the plate 164 substantially circumscribes at least a portion of the shaft end portion 158. Moreover, the plate 164, in the exemplary embodiment, facilitates distributing a load induced from the fastener 162. Alternatively, the fastener 162 may be a bolt that mates to a female threaded recess (not shown) formed in the shaft end portion 158.

During operation, incoming air is mixed with fuel to generate combustion gases. More specifically, in at least one embodiment (not shown), fuel, for example, gasoline and/or natural gas, is drawn into the intake air, and the fuel-air mixture is compressed and ignited within a combustion chamber (not shown). Thermal energy from the hot combustion gases is converted into rotational energy by a reciprocating engine (not shown) and is channeled towards the rotational components of the engine 150, such as the shaft 156. As explained in more detail below, the rotational energy enables the shaft 156 to rotate to initiate the engine 150. The rotation of the shaft 156 also enables the cooling device 160 to rotate to generate an airflow that may be directed to various portions of the engine 150 to facilitate cooling the engine 150.

Figure 4:
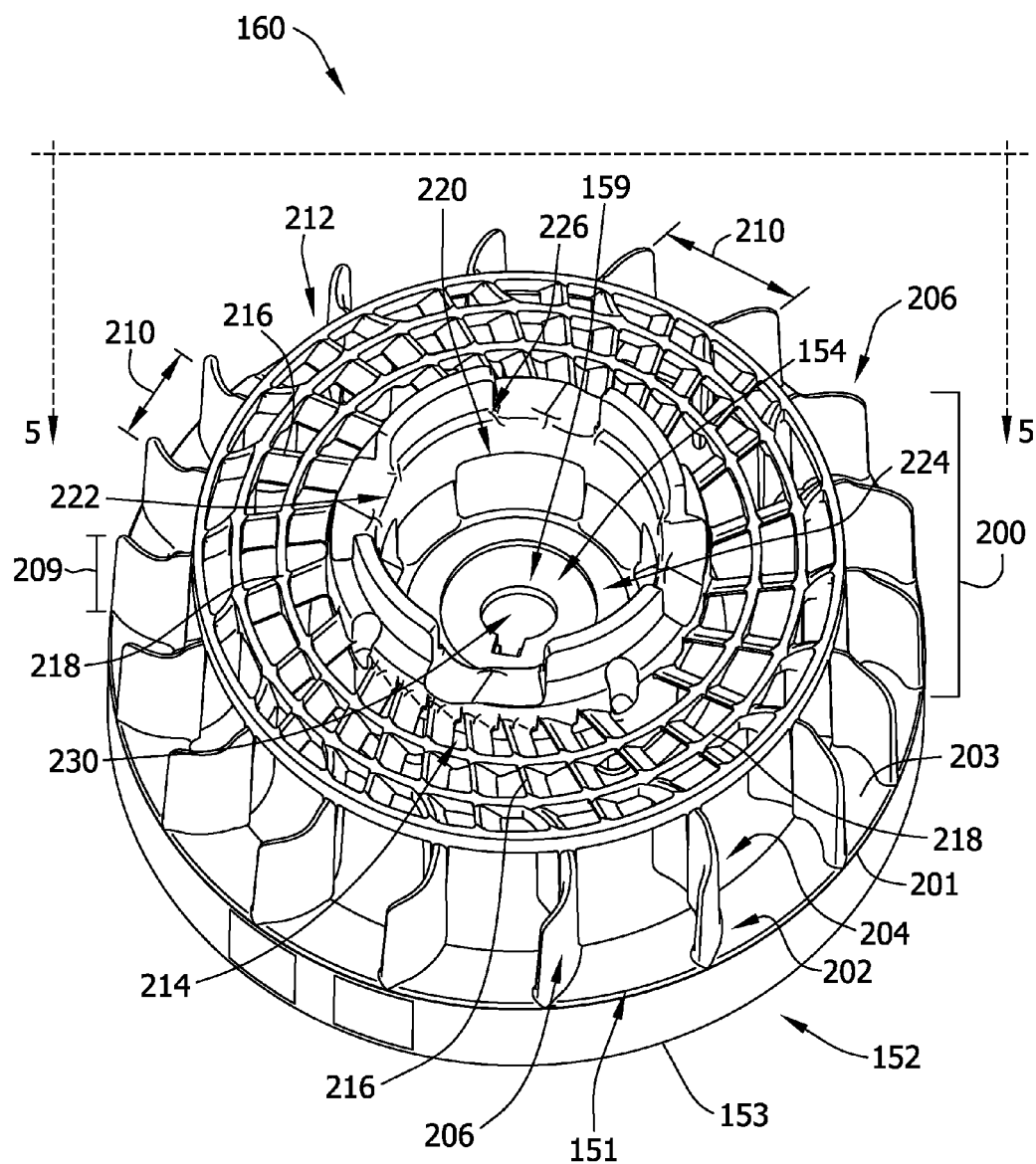
FIG. 4 is a schematic of a perspective view of an exemplary cooling device that may be used with the engine shown in FIG. 3 and taken along area 4.
Figure 5:
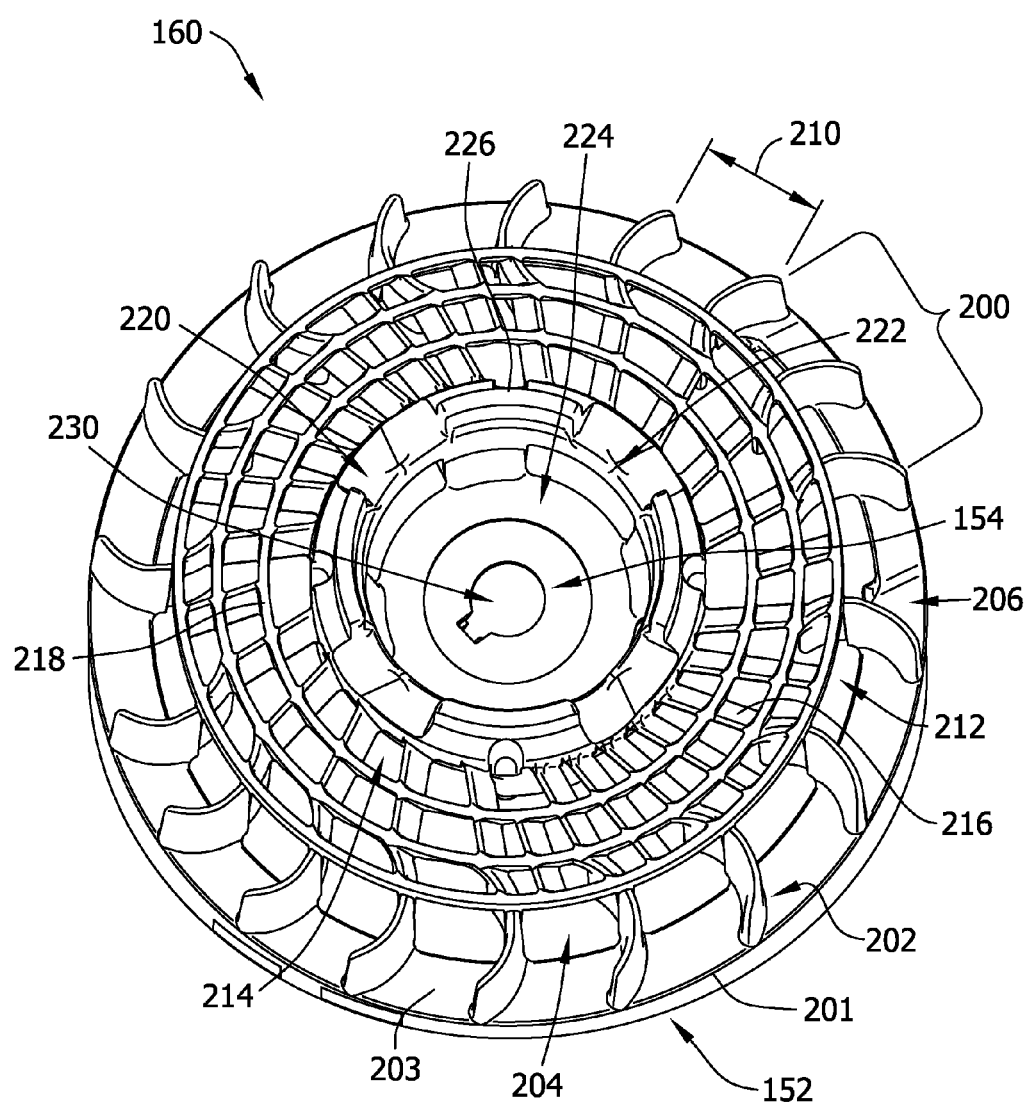
FIG. 5 is a schematic of the cooling device shown in FIG. 4 and taken along line 5-5.

FIG. 4 illustrates the cooling device 160 as taken along area 4 (shown in FIG. 3). FIG. 5 illustrates the cooling device 160 as taken along line 5-5 (shown in FIG. 4). In the exemplary embodiment, the cooling device 160 includes a flow control portion 200. More specifically, in the exemplary embodiment, flow control portion 200 is a fan that includes a substantially annular base 202 having a lower surface 201 and an opposite upper surface 203. The base 202 also includes an opening 204 defined therein that extends therethrough from lower surface 201 to upper surface 203. A diameter (not shown) for the base opening 204 is substantially larger than the diameter (not shown) for the base opening 124 (shown in FIG. 1) to facilitate fluid flow, such as air flow, from the adaptor plate 152 to the cooling device 160, as discussed below. The adaptor plate 152 is coupled to cooling device 160 such that at least a portion of flow control portion 200 is positioned against at least a portion of adaptor plate 102. More specifically, in the exemplary embodiment, the base lower surface 201 is positioned against the upper surface 151 of the adaptor plate 152 such that at least a portion of the adaptor plate upper surface 151 is positioned within the base opening 204. Accordingly, fluid flow, such as air flow, may be channeled over the adaptor plate upper surface 151 and through the base opening 204, via flow path 161 (shown in FIGS. 2 and 3), to the cooling device 160.

The flow control portion 200 also includes a plurality of blades 206 that are oriented substantially perpendicular to base upper surface 203 and that extend a vertical distance 209 from a portion of base upper surface 203. The distance 209 is substantially greater than the distance 129 (shown in FIG. 1) to facilitate greater fluid flow, such as air flow, within the flow control portion 200 and/or within the cooling device 160. Moreover, in the exemplary embodiment, blades 206 are formed integrally with base 202. For example, in one embodiment, each blade 206 is molded with base upper surface 203. In the exemplary embodiment, eighteen blades 206 are formed in the flow control portion 200. Alternatively, any number of blades 206 may be formed with the base 203 that enables cooling device 160 to function as described herein. In the exemplary embodiment, the blades 206 are not spaced substantially uniformly with respect to each other. For example, a distance 210 between adjacent pairs of blades 206 is different within flow control portion 200. Alternatively, the blades 206 may be spaced substantially uniformly with respect to each other, wherein the distance 210 between each blade 206 is substantially similar or may be spaced in any orientation that enables cooling device 160 to function as described herein. In the exemplary embodiment, each blade 206 may have a different and/or unique shape. Alternatively, blades 206 may be shaped substantially similarly. Moreover, blades 206 may have any shape that enables the cooling device 160 and/or the engine 150 (shown in FIG. 2) to function as described herein.

In the exemplary embodiment, the cooling device 160 also includes a grid portion 212 that is formed integrally with flow control portion 200. More specifically, in the exemplary embodiment, grid portion 212 extends from blades 206 and is positioned over at least a portion of each of the blades 206. For example, grid portion 212 may be molded with flow control portion 200 such that grid portion 212 is formed integrally with each of the blades 206. In the exemplary embodiment, grid portion 212 is substantially annular and includes at least one opening 214 defined therein. Opening 214 is substantially concentrically aligned with base opening 204. Grid portion 212 also includes a plurality of first fan blades 216 that extend radially outwardly from grid portion opening 214, and a plurality of annular second fan blades 218 that are oriented substantially perpendicularly to first fan blades 216. Each of the first and second fan blades 216 and 218, respectively, are positioned on at least a portion of the blades 206.

The number of first fan blades 216 may be equal to the number of second fan blades 218. Alternatively, the number of first fan blades 216 may not be equal to the number of second fan blades 218. Moreover, in the exemplary embodiment, first fan blades 216 may be shaped substantially rectangular, elliptical, and/or airfoil-shaped. Alternatively, first fan blades 216 and/or second fan blades 218 may have any other shape that enables the cooling device 160 and/or the engine 150 to function as described herein. In the exemplary embodiment, the first fan blades 216 may have a substantially uniform cross-section. Alternatively, the first fan blades 216 may have a non-uniform cross-section.

In the exemplary embodiment, cooling device 160 also includes an attachment portion 220 that is formed integrally with flow control portion 200 and grid portion 212. The attachment portion 220 is configured to couple cooling device 160 to at least one component of engine 150, such as the shaft 156 (shown in FIG. 2). More specifically, in the exemplary embodiment, the attachment portion 220 is formed integrally with flow control portion 200 and with grid portion 212 such that the attachment portion 220 is substantially concentrically aligned within the base opening 204 and the grid portion opening 214. In the exemplary embodiment, the attachment portion 220 is a substantially cylindrical cup that includes a first end portion 222 and a second end portion 224. The first end portion 222 includes a plurality of flanges 226 and the second end portion 224 includes an opening 230 formed therein that is sized and oriented to enable the second end portion 224 to couple to the shaft 156.

In the exemplary embodiment, the flow control portion 200, the grid portion 212, and the attachment portion 220 are formed integrally together such that the cooling device 160 is fabricated as a single unitary component. Portions 200, 212 and 220 may be formed via a variety of known manufacturing processes known in the art, such as, but not limited to, molding process, drawing process or a machining process. One or more types of materials may be used to fabricate the flow control device 160 with the materials selected based on suitability for one or more manufacturing techniques, dimensional stability, cost, moldability, workability, rigidity, and/or other characteristic of the material(s). For example, the cooling device 160 and its components may be fabricated from a thermoplastic polymer, such as, but not limited to, a polypropylene or polyamide resin, or an aluminum material. Since the cooling device 160 is a single unitary component, purchasing separate components is no longer necessary and assembly of multiple, complex components is eliminated when using the cooling device 160 with the engine 150. Accordingly, the cooling device 160 is more simple and efficient for use with the engine 150 as compared to known cooling devices.

During operation, a recoil rope (not shown) that is coupled to a drive pulley (not shown) pulls the pulley such that the pulley can pull the attachment portion 220. As the attachment portion 220 is pulled, the shaft 156 rotates to initiate the engine 150. Moreover, incoming air is mixed with fuel to generate combustion gases. More specifically, in at least one embodiment (not shown), fuel, for example, gasoline and/or natural gas, is drawn into the intake air, and the fuel-air mixture is compressed and ignited within a combustion chamber (not shown). Thermal energy from the hot combustion gases is converted into rotational energy by a reciprocating engine (not shown) and channeled towards the rotational components of the engine 150, such as the shaft 156. The rotation of the shaft 156 also enables the cooling device 160 to rotate to generate an airflow that may be directed to various portions of the engine 150 to facilitate cooling the engine 150. Fluid, such as air, is channeled past the adaptor plate upper surface 151 and through the base opening 204, via flow path 161. As the blades 206 rotate, the air is then channeled between adjacent blades 206. The air is also channeled between first fan blades 216 and second fan blades 218. The air flow may be channeled to various portions of the engine 150 to facilitate cooling engine 150.

As compared to known rotating components used to cool engines, the embodiments described herein provides a cooling device that is formed as a single, unitary component. More specifically, the cooling device described herein includes a flow control portion that includes a base and an opening defined therein. A plurality of blades extends integrally from at least a portion of the base. An integrally formed grid portion, having an opening defined therein, extends from the cooling device such that the grid portion opening is substantially concentrically aligned with the base opening. An attachment portion that couples the cooling device to at least one component of the engine is also formed integrally with the cooling device. Because the cooling device is a single component, purchasing separate components is no longer necessary and assembly time is reduced when using the device with the engine as compared to known cooling devices. Moreover, the unitary design is structurally stronger than known cooling devices.

Exemplary embodiments of systems and apparatus are described above in detail. The systems and apparatus are not limited to the specific embodiments described herein, but rather, components of each system and/or apparatus may be utilized independently and separately from other components described herein. For example, each system may also be used in combination with other systems and is not limited to practice with only systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cooling device for use with an engine, said cooling device comprising:
   a flow control portion comprising an annular base having an opening defined therein, said flow control portion further comprises a plurality of blades extending radially inward from at least a portion of said annular base such that a flowpath is defined through said opening and past said plurality of blades;
   a grid portion comprising an opening defined therein, said grid portion opening is substantially concentrically aligned with said base opening; and
   an attachment portion extending at least partially through said base opening and said grid portion opening, wherein said attachment portion comprises a plurality of flanges spaced circumferentially about a centerline of said attachment portion, and at least one fastener opening positioned radially outward from said plurality of flanges, said attachment portion formed integrally with said flow control portion and said grid portion, wherein said at least one fastener opening is sized to receive a fastener therethrough.

2. A cooling device in accordance with claim 1, wherein said grid portion extends from at least a portion of each of said plurality of blades.

3. A cooling device in accordance with claim 1, wherein each of said plurality of blades are spaced substantially uniformly with respect to each other.

4. A cooling device in accordance with claim 1, wherein each of said plurality of blades are spaced substantially non-uniformly with respect to each other.

5. A cooling device in accordance with claim 1, wherein at least one of said plurality of blades comprises a shape that is different than a shape of the remaining of said plurality of blades.

6. A cooling device in accordance with claim 1, wherein said grid portion comprises a plurality of first fan blades and a plurality of second fan blades, said first plurality of fan blades extend radially outwardly from said grid portion opening, each of said plurality of second fan blades are oriented substantially perpendicularly to said plurality of first fan blades.

7. A cooling device in accordance with claim 6, wherein each of said plurality of first fan blades comprises at least one of a substantially rectangular shape, a substantially elliptical shape, and a substantially airfoil shape.

8. An engine comprising:
   a rotatable shaft;
   an adaptor plate coupled to said rotatable shaft, said adaptor plate comprises a surface comprising a first portion and a second portion, said first portion extends substantially curvilinearly towards said second portion to facilitate defining a flow path within said engine; and
   a cooling device coupled to said rotatable shaft and to said adaptor plate such that said cooling device is positioned against at least a portion of said adaptor plate surface to enable fluid to be channeled from said adaptor plate surface to said cooling device via the flow path, said cooling device comprises a flow control portion, a grid portion, and an attachment portion, said flow control portion comprises an opening defined therein and a plurality of blades extending outward from said opening, said opening is sized to receive at least a portion of said adaptor plate therein, said grid portion comprises an opening defined therein and said grid portion opening is substantially concentrically aligned with said flow control portion opening, said attachment portion comprising a plurality of flanges spaced circumferentially about a centerline of said attachment portion, and at least one fastener opening positioned radially outward from said plurality of flanges, said attachment portion is configured to couple said cooling device to said rotatable shaft.

9. An engine in accordance with claim 8, wherein said adaptor plate comprises at least one opening defined therein, at least a portion of said rotatable shaft extends through said adaptor plate opening.

10. An engine in accordance with claim 8, wherein said grid portion extends from at least a portion of each of said plurality of blades.

11. An engine in accordance with claim 8, wherein each of said plurality of blades are spaced substantially uniformly with respect to each other about said flow control portion.

12. An engine in accordance with claim 8, wherein each of said plurality of blades are spaced substantially non-uniformly with respect to each other about said flow control portion.

13. An engine in accordance with claim 8, wherein at least one of said plurality of blades comprises a shape that is different than a shape of at least one other of said plurality of blades.

14. An engine in accordance with claim 8, wherein said grid portion comprises a plurality of first fan blades that extend radially outwardly from said grid portion opening and a plurality of second fan blades that are each oriented substantially perpendicular to said plurality of first fan blades.

15. An engine in accordance with claim 8, wherein each of said plurality of first fan blades comprises at least one of a substantially rectangular shape, a substantially elliptical shape, and a substantially airfoil shape.

16. A cooling device for use with an engine, said cooling device comprising:
   a flow control portion comprising an annular base having an opening defined therein, said flow control portion further comprises a plurality of blades extending radially inward from said annular base such that a flowpath is defined through said opening and past said plurality of blades;
   a grid portion comprising an opening defined therein, said grid portion formed integrally with said flow control portion, said grid portion comprises a plurality of first fan blades that extend radially outwardly from said grid portion opening and a plurality of second fan blades that are substantially perpendicular to said plurality of first fan blades, said cooling device configured to rotate to provide cooling flow to facilitate cooling the engine; and
   an attachment portion formed integrally with said grid portion and said flow control portion, said attachment portion comprising a plurality of flanges spaced circumferentially about a centerline of said attachment portion, and at least one fastener opening positioned radially outward from said plurality of flanges, wherein said at least one fastener opening is sized to receive a fastener therethrough.

17. A cooling device in accordance with claim 16, wherein each of said plurality of flow control portion blades are spaced substantially non-uniformly with respect to each other.

18. A cooling device in accordance with claim 16, wherein at least a first of said plurality of flow control portion blades comprises a shape that is different than a shape of at least a second of said plurality of flow control portion blades.

19. A cooling device in accordance with claim 16, wherein each of said plurality of first fan blades comprises at least one of a substantially rectangular shape, a substantially oval shape, and a substantially airfoil shape.

* * * * *